(12) United States Patent
Dolgikh

(10) Patent No.: US 9,869,538 B2
(45) Date of Patent: Jan. 16, 2018

(54) MEASURING DEVICE AND RELATED METHODS

(71) Applicant: Delcam Limited, Birmingham, West Midlands (GB)

(72) Inventor: Dmitriy Dolgikh, Solihull (GB)

(73) Assignee: Delcam Limited, Birmingham, West Midlands (GB)

( * ) Notice: Subject to any disclaimer, the term of this patent is extended or adjusted under 35 U.S.C. 154(b) by 273 days.

(21) Appl. No.: 14/878,813

(22) Filed: Oct. 8, 2015

(65) Prior Publication Data

US 2016/0102960 A1    Apr. 14, 2016

(30) Foreign Application Priority Data

Oct. 8, 2014   (GB) .................................... 1417771.1

(51) Int. Cl.
G01B 5/00      (2006.01)
G01B 5/008     (2006.01)
G01B 21/04     (2006.01)

(52) U.S. Cl.
CPC .......... G01B 5/008 (2013.01); G01B 21/047 (2013.01)

(58) Field of Classification Search
CPC .............................. G01B 21/047; G01B 5/008
USPC ........................................................... 33/503
See application file for complete search history.

(56) References Cited

U.S. PATENT DOCUMENTS

| | | | | |
|---|---|---|---|---|
| 5,898,590 | A | * | 4/1999 | Wampler ............. G05B 19/401 33/504 |
| 6,014,816 | A | | 1/2000 | Matsumiya et al. |
| 6,301,796 | B1 | * | 10/2001 | Cresson ................... G01B 7/00 33/556 |
| 2008/0189969 | A1 | | 8/2008 | Fuchs et al. |
| 2015/0000148 | A1 | * | 1/2015 | Abe ........................ G01B 5/008 33/503 |
| 2016/0084633 | A1 | * | 3/2016 | Ferrari ................... G01B 21/04 33/503 |

(Continued)

FOREIGN PATENT DOCUMENTS

| | | |
|---|---|---|
| GB | 2 350 429 | 11/2000 |
| WO | WO 03/095943 | 11/2003 |

(Continued)

OTHER PUBLICATIONS

Search Report in Application No. GB 1417771.1, dated Feb. 12, 2015, 6 pages.

*Primary Examiner* — Yaritza Guadalupe-McCall
(74) *Attorney, Agent, or Firm* — Fish & Richardson P.C.

(57) ABSTRACT

A measuring device and related methods include, in at least one aspect, a method for controlling a measuring device: including processing data providing information on a shape of the part to determine a set of suitable surface touch positions, the set of suitable surface touch positions being used to generate a first queue; instructing the measuring device to move at least one of one or more probes to each position listed in the first queue, and to take a surface touch measurement at each position; calculating a set of suitable edge touch positions based on the surface touch measurements, the set of suitable edge touch positions being used to generate a second queue of measurements; and instructing the measuring device to move the at least one of the one or more probes to each position listed in the second queue, and to take an edge measurement at each position.

17 Claims, 11 Drawing Sheets

(56) References Cited

U.S. PATENT DOCUMENTS

| | | | |
|---|---|---|---|
| 2016/0102960 A1* | 4/2016 | Dolgikh | G01B 21/047 33/503 |
| 2016/0169656 A1* | 6/2016 | Padovani | G01B 21/047 33/503 |
| 2016/0178362 A1* | 6/2016 | Iseli | G01B 5/008 33/503 |

FOREIGN PATENT DOCUMENTS

| | | |
|---|---|---|
| WO | WO 2007/141509 | 12/2007 |
| WO | WO 2008/074989 | 6/2008 |
| WO | WO 2009/024783 | 2/2009 |
| WO | WO 2012/037059 | 3/2012 |
| WO | WO 2013/050729 | 4/2013 |

* cited by examiner

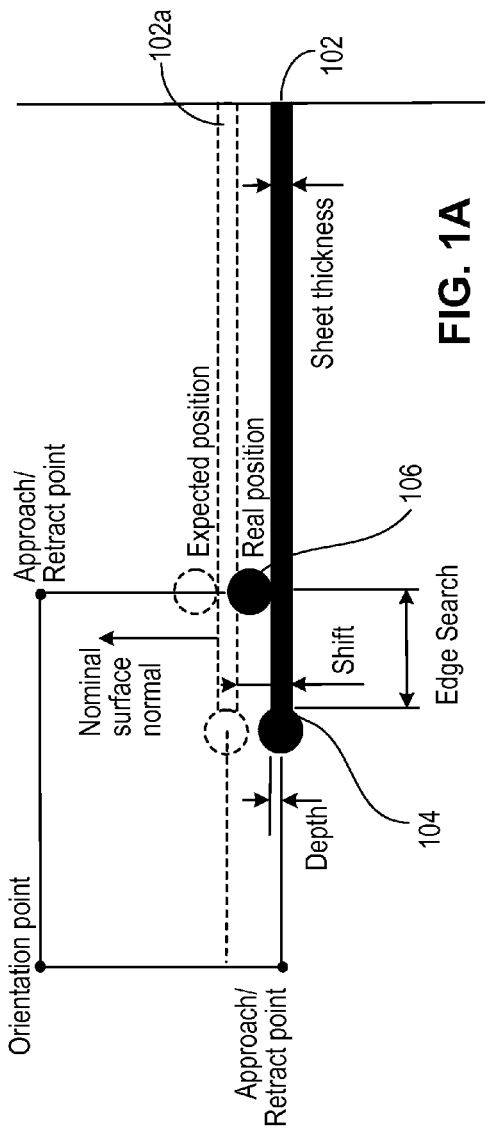
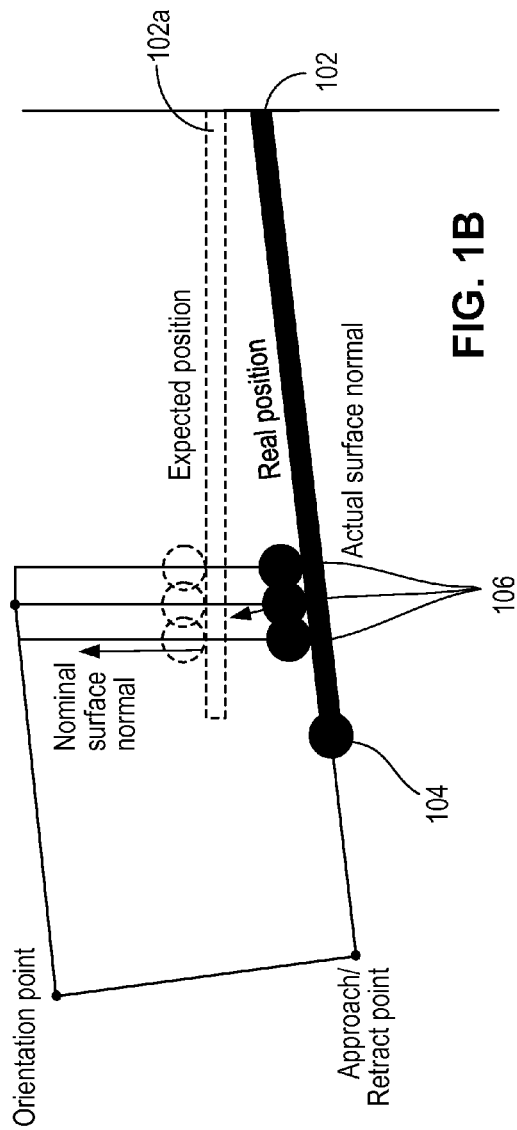
FIG. 1A
FIG. 1B

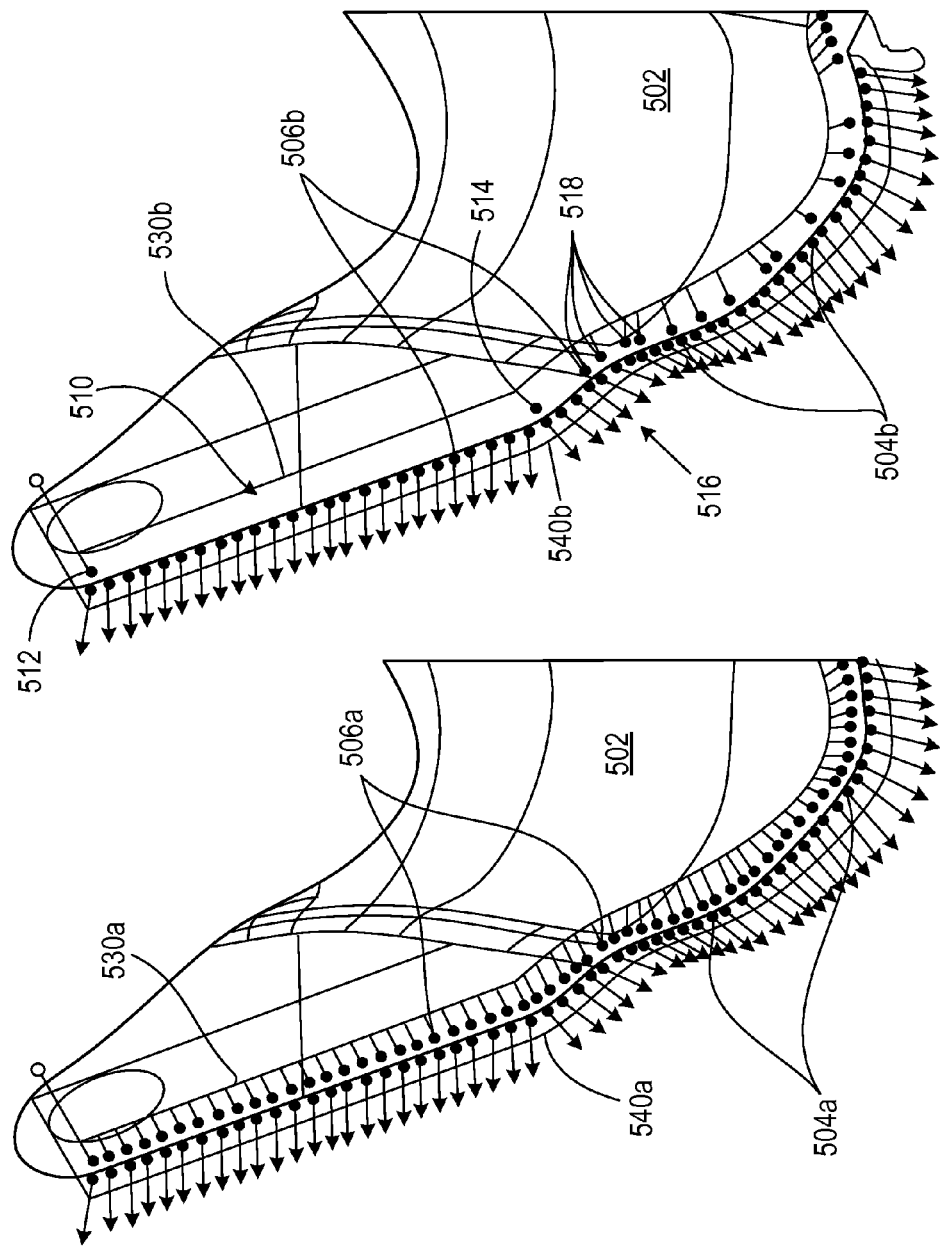

MEASURING DEVICE AND RELATED METHODS

CROSS-REFERENCE TO RELATED APPLICATION

This application is based upon and claims the benefit of priority of the prior United Kingdom Patent Application No. 1417771.1, filed on Oct. 8, 2014, the entire contents of which is incorporated herein by reference.

BACKGROUND

This invention relates to a measuring device, methods of controlling measuring devices and to methods of generating paths to be used in controlling a measuring device.

In order to ensure that a manufactured part conforms to its design, it is often the case that the part's dimensions can be checked in an automated manner. This can be performed in a number of ways, but often a probe is moved into contact with the surface of the part, and the position of the probe is noted as contact is made with the part. Multiple contacts between the probe and the part are made therefore building up a cloud of points that correspond to actual surface of the part.

Whilst some embodiments may have wider applicability, it is convenient to highlight the background of the invention with reference to pressed sheet parts, and in particular, but again not exclusively, pressed metal parts. The skilled person will appreciate that such pressed metal parts have a thickness which tends to be quite small; i.e., the part is often a thin shell. Thus, the edges of the shell tend to be thin.

It can be difficult to ensure that the probe contacts the edges of the shell because of the edge's small dimension. Small errors in the parts shape can mean the edge moves sufficiently so that a probe attempting to measure the position of the edge, miss the edge or at least do not contact it properly.

Accordingly, it is often the case that the probe is brought into contact with the part away from the region of the edge, in what may be thought of as a surface-touch. The position of this surface-touch can then be used to determine the position of the edge of the shell so that a probe can be brought into contact correctly with that edge.

However, the prior art does not calculate the path for the probe as efficiently as may be desired. In this context, it will be appreciated that in a production environment it is desired to measure parts as quickly as possible in order that the production line becomes efficient as possible.

FIGS. 1A and 1B are used to further discuss the prior art, where FIGS. 1A and 1B illustrate two examples of parts being measured by adaptive measurement in which the real position of the part 102 is not at the expected position of the part 102a. In the example shown in FIG. 1A, a probe 106 is used to perform a surface touch away from an edge 104 of the part 102. This surface-touch provides the displacement of the part from the expected position to the real position. The displacement that is calculated can then be used to determine more accurately where the edge 104 of the part 102 should be in order that the probe can more accurately measure the position of the edge 104.

In the second example, the probe 106 is used to measure the real position of the part 102 a plurality of times by making a plurality (in this example three) surface touches away from an edge 104 of the part 102. From this plurality of surface-touches, it is possible to calculate a plane of the part 102 which again can be used to allow the probe 106 to more accurately measure the position of the edge 104.

SUMMARY

According to a first aspect of the invention, there is provided a measuring device arranged to take measurements of a part using one or more probes which are controlled to touch the part at positions. Conveniently, two or more queues of measurement positions are used to control the position of the one or more probes and typically the queues will comprise: a first queue comprising positions at which surface touch measurements are to be performed, wherein each surface touch measurement is performed by moving at least one of the one or more probes into contact with a surface of the part; and a second queue comprising positions at which edge measurements are to be performed, wherein each edge measurement is performed by moving at least one of the one or more probes into contact with an edge region of the part.

Embodiments may be arranged such that the measuring device is arranged to perform at least one of the following steps:
  (i) process the first queue, comprising surface touch measurement positions;
  (ii) move at least one of the one or more probes to each position listed in the first queue, taking a surface touch measurement at each position to generate surface touch measurement data;
  (iii) process the second queue, comprising edge measurement positions; and
  (iv) move at least one of the one or more probes to each position listed in the second queue, taking an edge measurement at each position to generate edge measurement data.

Conveniently, the measuring device is arranged to perform at least one of steps (ii) and (iv) asynchronously.

The measuring device may be arranged to output measurement data, comprising at least one position for the contact between the at least one probe, for each surface touch measurement and/or each edge measurement following the corresponding measurement. The output of such measurement data is convenient to allow the positions at which edge measurement positions are to be taken to be determined and also to analyze the shape of the part to determine if the part has been manufactured according to its tolerances.

Conveniently, the measuring device is arranged to take surface touch measurements proximate an edge region of the part. The surface of a part, and in particular a sheet part, is likely to be closer to its designed shape away from the edge region and thus, embodiments that take surface touch measurements in this manner should be more accurate.

In some embodiments, the measuring device is arranged to take an edge measurement proximate substantially one or more surface touch measurements. Such embodiments are convenient as the position of the part is provided by a surface touch measurement and therefore performing an edge measure near to this can help to ensure that the edge measurement is performed accurately. Here proximate may mean within substantially any of the following: 20 mm; 15 mm; 10 mm; 7 mm; 5 mm; 3 mm; 1 mm or any number in between. Advantageously, surface touch measurements are taken far enough away from the edge (i.e., beyond a region of the edge) such that there is little chance of the probe tip missing the surface, or making poor contact with the surface. This distance will be a function of the tip dimensions (e.g., diameter), of the flexibility of the part being measured (for example, a function of material and/or thickness of the material). Embodiments can arrange the surface touch measurements to be between substantially 3 times and substantially 10 times the thickness of the material away from the edge of the part.

In some embodiments, the measuring device is arranged to take an edge measurement corresponding to each surface touch measurement. Such embodiments may provide a higher degree of certainty in relation to the dimensions of the shape.

Conveniently, the measuring device is arranged to calculate the positions, within the second queue, at which edge measurements are to be performed based on the surface touch measurement data created by the performance of a surface touch measurement.

In some embodiments, the measuring device may be arranged to take fewer surface touch measurements caused by the first queue when compared to the number of edge measurements caused by the second queue. Such embodiments are advantageous in that they will be quicker than embodiments in which an edge measurement is taken for substantially each surface touch measurement.

It is conceivable that some measuring devices may comprise a plurality of probes. The skilled person will appreciate how to modify aspects of the invention in order to control more than one probe. For example, it may be that a first probe can be controlled to execute the first queue of positions and a second probe can be controlled to execute the second queue of positions.

According to a second aspect of the invention there is provided a computer-implemented method for controlling a measuring device to take measurements of a part using one or more probes which are controlled to touch the part at positions. Typically two or more queues of measurement positions are used to control the position of the one or more probes and typically the queues comprise: a first queue comprising positions at which surface touch measurements are to be performed, wherein each surface touch measurement is performed by moving at least one of the one or more probes into contact with a surface of the part; and a second queue comprising positions at which edge measurements are to be performed, wherein each edge measurement is performed by moving at least one of the one or more probes into contact with an edge region of the part.

Embodiments may be arranged such that the method comprises at least one of the steps:
  (i) processing data providing information on the shape of the part to determine a set of suitable surface touch positions, the set of suitable surface touch positions being used to generate the first queue;
  (ii) instructing the measuring device to move at least one of the one or more probes to each position listed in the first queue, and to take a surface touch measurement at each position;
  (iii) calculating a set of suitable edge touch positions based on the surface touch measurements, the set of suitable edge touch positions being used to generate the second queue of measurements; and
  (iv) instructing the measuring device to move the at least one of the one or more probes to each position listed in the second queue, and to take an edge measurement at each position.

Conveniently, the data providing information on the shape of the part is provided by a CAD model, or other 3D model of the part. The skilled person will appreciate that such a CAD or 3D model may be thought of as being machine-readable data (tangibly encoded in a machine-readable medium) that provides details of the shape of an object, which is typically generated using Computer Aided Design (CAD) tools.

According to a third aspect of the invention there is provided a processing apparatus arranged to control a measuring device to measurements of a part using one or more probes which are controlled to touch the part at positions. Generally two or more queues of measurement positions are used to control the position of the one or more probes and typically the queues comprise: a first queue comprising positions at which surface touch measurements are to be performed, wherein each surface touch measurement is performed by moving at least one of the one or more probes into contact with a surface of the part; and a second queue comprising positions at which edge measurements are to be performed, wherein each edge measurement is performed by moving at least one of the one or more probes into contact with an edge region of the part.

Embodiments may comprise programming the processing apparatus to perform at least one the following steps:
  (i) process data providing information on the shape of the part to determine a set of suitable surface touch positions, the set of suitable surface touch positions being used to generate the first queue;
  (ii) instruct the measuring device to move at least one of the one or more probes to each position listed in the first queue, and to take a surface touch measurement at each position;
  (iii) calculate a set of suitable edge touch positions based on the surface touch measurements, the set of suitable edge touch positions being used to generate the second queue of measurements; and
  (iv) instruct the measuring device to move the at least one of the one or more probes to each position listed in the second queue, and to take an edge measurement at each position.

According to a fourth aspect of the invention there is provided a machine-readable medium containing instructions which when executed by a processing apparatus cause that processing apparatus to perform the method of the first aspect of the invention, or to make the processing apparatus function as the processing apparatus of the second aspect of the invention.

According to a fifth aspect of the invention there is provided a computer-implemented method of generating a path for a measuring device to take measurements of a part using one or more probes which are controlled to touch the part at positions. In at least some embodiments, two or more queues of measurement positions are used to control the position of the one or more probes and typically the queues comprise: a first queue comprising positions at which surface touch measurements are to be performed, wherein each surface touch measurement is performed by moving at least one of the one or more probes into contact with a surface of the part; and a second queue comprising positions at which edge measurements are to be performed, wherein each edge measurement is performed by moving at least one of the one or more probes into contact with an edge region of the part.

Embodiments may be arranged such that method comprises at least one of the following steps:
  (i) processing data providing information on the shape of the part to determine a set of suitable surface touch positions, the set of suitable surface touch positions being used to generate the first queue; and
  (ii) processing surface touch measurement data corresponding to the first queue to determine a set of suitable edge touch positions, the set of suitable edge touch positions being used to generate the second queue of measurements.

In some embodiments, edge measurements may be taken at an edge of the part rather than on an edge region. In particular, when the method is being used in association with a sheet part, it may be appropriate to take measurements on an edge (i.e., on the minor dimension of the sheet) as opposed to on an edge region.

According to a sixth aspect of the invention there is provided a processing apparatus arranged to generate a path for a measuring device to take measurements of a part using one or more probes which are controlled to touch the part at positions. Embodiments may be arranged to use two or more queues of measurement positions to control the position of the one or more probes and the queues typically comprise: a first queue comprising positions at which surface touch measurements are to be performed, wherein each surface touch measurement is performed by moving at least one of the one or more probes into contact with a surface of the part; and a second queue comprising positions at which edge measurements are to be performed, wherein each edge measurement is performed by moving at least one of the one or more probes into contact with an edge region of the part.

Embodiments may be arranged such that the processing apparatus is programmed to perform at least one of the following steps:
(i) process data providing information on the shape of the part to determine a set of suitable surface touch positions, the set of suitable surface touch positions being used to generate the first queue; and
(ii) process surface touch measurement data corresponding to the first queue to determine a set of suitable edge touch positions, the set of suitable edge touch positions being used to generate the second queue of measurements.

According to a seventh aspect of the invention, some embodiments may further comprise comparing at least one of the edge measurements against an expected edge measurement and determining if a discrepancy exists between the expected and actual edge measurements. Such embodiments are convenient as they allow areas of the part that are out of tolerance (e.g., a discrepancy exists between the expected and actual edge measurements) to be investigated further.

Embodiments may be arranged such that should a discrepancy be determined, then further positions are generated to form a third queue of measurements, wherein the third queue comprises further positions at which surface touch measurements and/or edge measurements are to be performed.

Conveniently, embodiments receive position data from edge measurements taken at edge touch positions defined in the second queue.

According to an eighth aspect of the invention, there is provided a machine-readable medium containing instructions which when read by a processing apparatus cause that processing apparatus to perform the method of the seventh aspect of the invention.

According to a ninth aspect of the invention, there is provided a method of generating a path for a measuring device to take measurements of a part using one or more probes which are controlled to touch the part at positions, the measurements comprising at least one of the following:

(i) surface touch measurements, wherein each surface touch measurement is performed by moving at least one of the one or more probes into contact with a surface of the part; and
(ii) edge measurements, wherein each edge measurement is performed by moving at least one of the one or more probes into contact with an edge region of the part, and wherein the positions at which the edge measurements are to be performed are calculated based on positions generated from surface touch measurements; and
(iii) wherein more than one edge measurement is generated for at least some of the surface touch measurement.

According to a tenth aspect of the invention, there is provided a processing apparatus arranged to generate a path for a measuring device to take measurements of a part using one or more probes which are controlled to touch the part at positions, wherein the measurements comprises at least one of the following:

(i) surface touch measurements, wherein each surface touch measurement is performed by moving at least one of the one or more probes into contact with a surface of the part; and
(ii) edge measurements, wherein each edge measurement is performed by moving at least one of the one or more probes into contact with an edge region of the part, and wherein the positions at which the edge measurements are to be performed are calculated based on positions generated from surface touch measurements; and.
(iii) wherein the processing apparatus is arranged to generate more than one edge measurement for at least some of the surface touch measurements.

According to an eleventh aspect of the invention, there is provided a machine-readable medium containing instructions which when read by a processing apparatus cause that processing apparatus to provide the method of the tenth aspect of the invention.

The machine-readable medium of any of the above aspects of the invention may comprise a floppy disk, a CDROM/RAM, a DVD ROM/RAM (including −R/−RW/+R/+RW), any other form of magneto and/or optical storage, a memory (such as an SD card, USB memory; a CF card, hard drive, or the like), or any other tangible medium, regardless of the form of encoding, e.g., a tangibly encoded email, Internet download (including an FTP transfer, streamed media, or the like), or other transmitted signal.

The skilled person will appreciate that many features of aspects of the invention may be provided in software. However, the skilled person will appreciate that such features which are capable of being provided in software may also be provided in firmware or hardware, or indeed in any combination of software, firmware and/or hardware.

The skilled person will also appreciate that a feature described in relation to any aspect or embodiment of the invention can be applied, mutatis mutandis, to any other aspect or embodiment of the invention.

BRIEF DESCRIPTION OF THE DRAWINGS

Embodiments will now be described in more detail by way of example only with reference to the accompanying drawings in which:

FIG. 1A (PRIOR ART) illustrates an adaptive probing method using one surface touch measurement per edge measurement;

FIG. 1B (PRIOR ART) illustrates an adaptive probing method using three surface touch measurements per edge measurement;

FIG. 5A illustrates paired edge measurement and surface touch measurement positions for use in part measurement;

FIG. 5B illustrates the use of sparse surface touch measurements for the same edge measurement density as shown in FIG. 5A;

DETAILED DESCRIPTION

Figure 2:
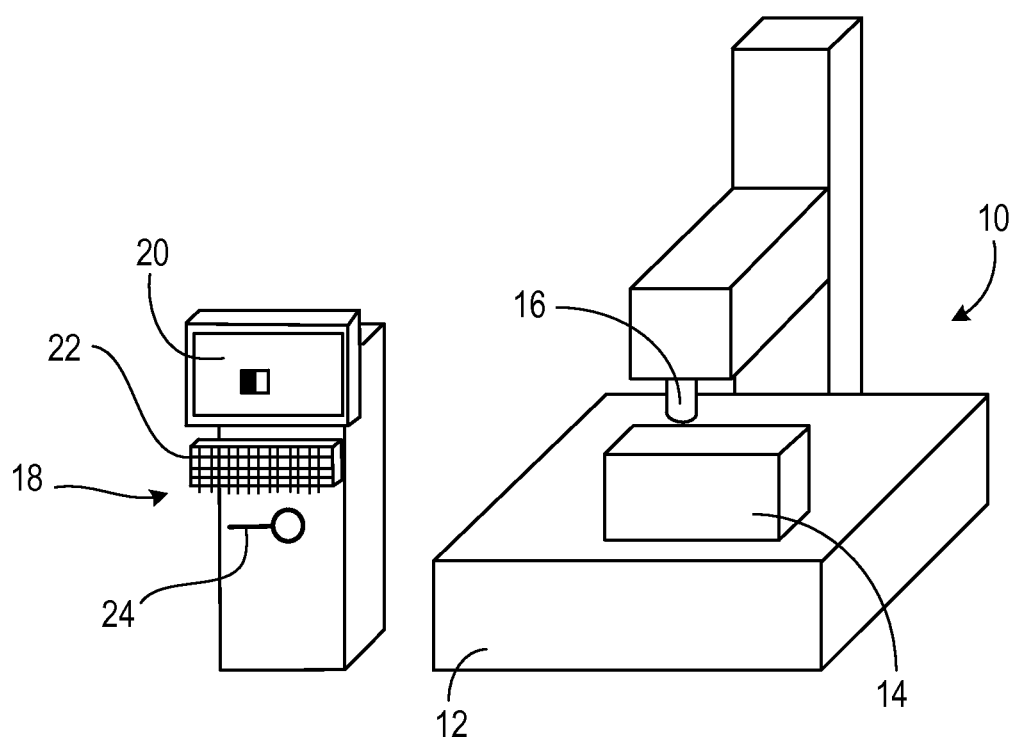
FIG. 2 shows a measuring device arranged to provide a measuring device to provide embodiments of the invention.

FIG. 2 shows a measuring device 10 which is a 6-axis co-ordinate measuring machine, which comprises a work receiving area 12 arranged to hold a part 14 that is to be measured, a probe 16 for contacting the part 14, and processing circuitry 18 for controlling the measuring device 10. Thus, the measuring device 10 is able, using the techniques described in the embodiments below, to take measurements of the part 14.

In other embodiments, the measuring device may be provided by other mechanisms such as a machine tool, a robotic arm, or the like. The skilled person will appreciate that although embodiments are described in relation to mechanical contact probes, other embodiments may use optical measurement, such as LASER, or the like.

In general, embodiment may be applicable to any form of NC (numerically controlled) coordinate measuring device.

The processing circuitry comprises a display 20 arranged to display information, keyboard 22 for inputting information to the processing circuitry 18, and a data carrier reader 24 arranged to read media such as CD-ROMs, etc. In some embodiments the processing circuitry 18 may be a computer such as a PC, etc., interfaced to the measuring device 10. In other embodiments the processing circuitry may be provided as part of the measuring device 10.

The processing circuitry 18 is capable of receiving code, either via the keyboard 22, via the data reader 24 or via a network link thereto. This code programs the processing circuitry to control the probe 16 to process the part 14 in order to check the dimensions of the part 14.

Figure 3A:
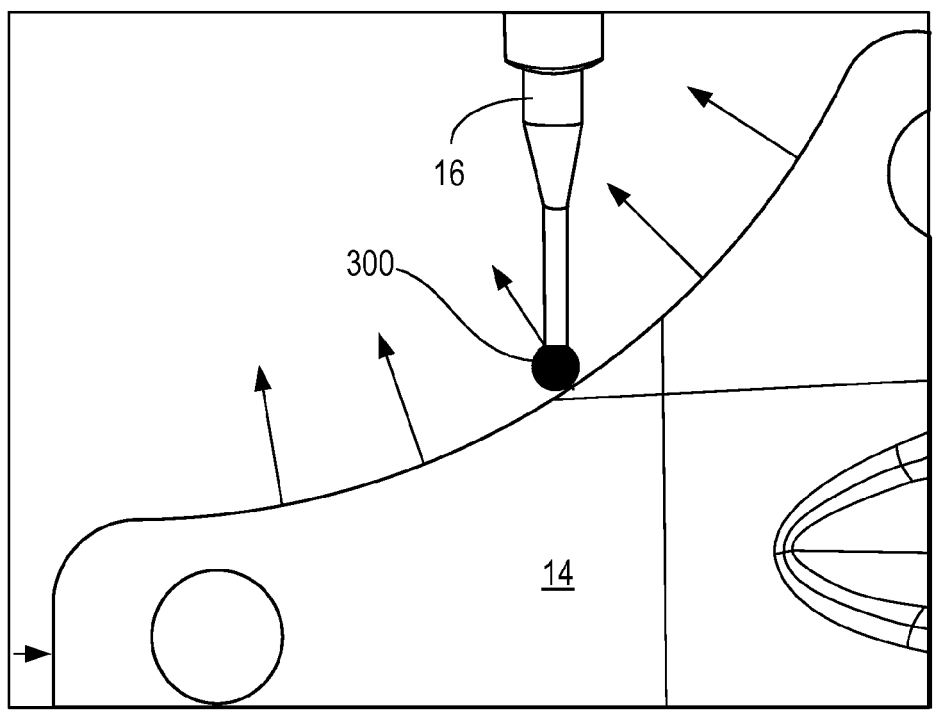
FIG. 3A illustrates a part to be measured and an edge measurement position.
Figure 3B:
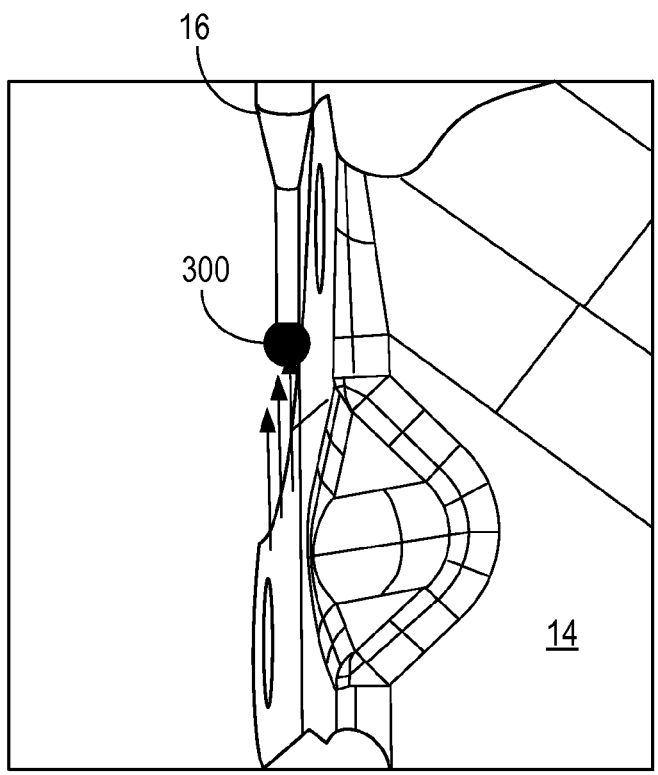
FIG. 3B illustrates a side view of FIG. 3A.

FIGS. 3A and 3B show an example in which the part 14 comprises a pressed sheet part. Sheet parts, which might be metal, in particular highlight advantages of the embodiments due to the distortion that can occur in such sheet parts. However, the skilled person will appreciate that embodiments of the invention could still be used on non-sheet parts and embodiments are useful in allowing distorted parts (i.e., parts in which the shape is not as designed) to be accurately measured.

Referring to FIG. 3a, it can be seen that the probe 16 comprises a measuring tip 300, which here comprises a substantially spherical tip. The part 14 comprises a pressed sheet which is shown in plan in FIG. 3A and a side elevation is shown in FIG. 3B to highlight the thinness of the part 14 relative to the tip 300. Looking at FIG. 3B it can be seen that the diameter of the tip 300 is greater than the thickness of the sheet used to form the part 14.

Figure 3C:
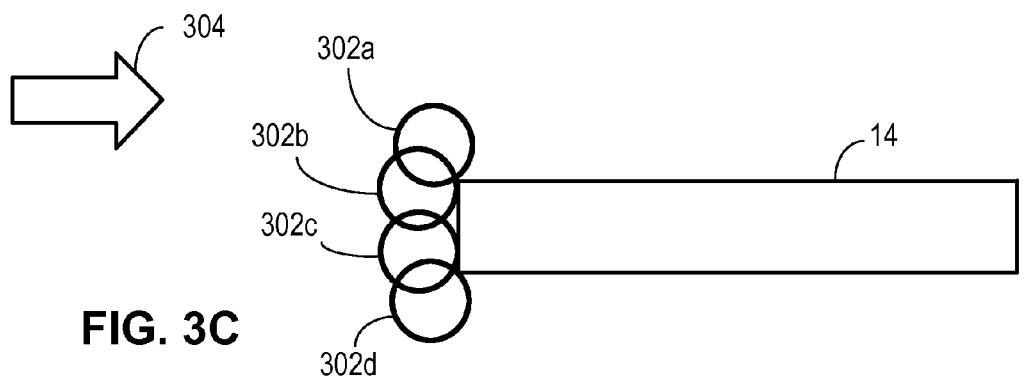
FIG. 3C illustrates valid and invalid edge measurement positions for an embodiment.

FIG. 3C illustrates how the tip 300 should be brought into contact at positions with the part in order to perform a valid measurement. In particular the Figure shows four potential contact positions 302a-d (i.e., the point of contact) between the tip 300 and an edge of the part 14. These positions 302a-d are used to illustrate how misalignment of the probe 16, which may for example occur if the part 14 is not where it is thought to be, can lead to in-accurate measurement.

In this example, the probe 16 is brought toward the part 14 in the direction of the arrow 304. In position 302a, the probe tip is too high relative to the part 14 (perhaps because the edge of the part has been deformed downwards) and the probe tip proceeds too far to the right (relative to the figure) before making contact with the part 14 and therefore the contact position will be recorded too far to the right and be inaccurate.

In positions 302b and 302c, the contact position is correct and the position of the edge of the part 14 will correctly be recorded.

In position 302d, it can be seen that the probe tip is too low relative to the part 14 (perhaps because the edge of the part has been deformed upwards) and the probe tip again proceeds too far to the right (relative to the figure) before making contact with the part 14 and therefore the contact position will be again be recoded too far to the right and be inaccurate.

Figure 4A:
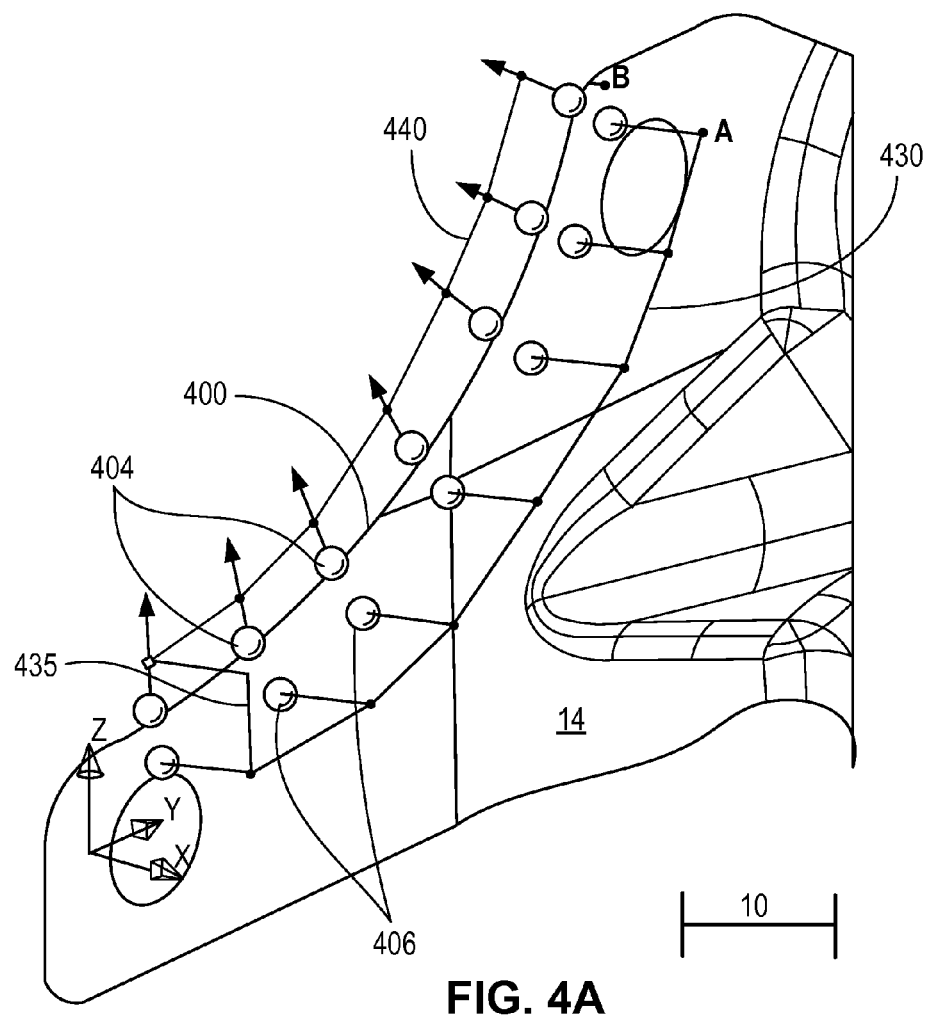
FIG. 4A illustrates a trajectory for measurement of a part which uses two queues of points.

FIG. 4A is used to illustrate how the probe 16, and in particular the tip 300 of the probe 16, are moved relative to the part 14. Again, the part 14 is shown as being a sheet metal part.

As described elsewhere, it is desirable to accurately measure the position of the edge of the sheet and to do this the tip of the probe 16 is brought into contact with the edge as illustrated with reference to positions 302b, and 302c in FIG. 3C.

To achieve this measurement of the edge 400, the measuring device 10 is controlled to move the tip 300 along two paths 430 440. Each path 430, 440 is defined by a queue of positions to which the measuring device 10 should move the probe 16 to move the probe 16 along the paths 430, 440.

The first path 430, defined by data in the first queue, comprises a plurality of positions at which the tip 300 of the probe 16 is to be brought into contact with the part 14 away from a region of the edge 400. Typically, the probe 16 is brought toward the part 14 substantially along a normal to the surface of the part, or at least substantially along a normal to the expected position of the part and as such, away from the edge region, there should be little chance of an incorrect position being recorded since the problems highlighted with reference to FIG. 3C should not occur remote the edge region. Points at which the tip 300 is brought into contact with the part 14 remote the edge region may be thought of as being surface touch points 406 at which a surface touch measurement is performed. Measurement data which comprises a position at which contact was made with the part is generated when a surface touch measurement is performed. In the Figure, the position of each surface touch point is shown as a dot (see 406) to highlight the position at which the tip 300 would be. Thus, in the embodiment being described, the first queue of positions defines a path along which a probe is moved to take surface touch measurements where a probe is brought into contact with a surface of the part.

Thus, each surface touch measurement is performed by moving the probe 16 into contact with the surface of the part 14 at one of the surface touch positions 406 specified by the first queue defining the path 430. In the embodiment being described, the first queue is executed asynchronously by the measuring device 10 wherein the measuring device 10 accept several or all commands (for example a queue of positions), stores them in a buffer and executes them as soon as it becomes safe or convenient to do so. Embodiments which store a queue of commands in advance allow the speed at which measurements can be taken to be increased as, in general, the measuring device 10 does not need to stop between measurements.

The surface touch positions 406, at which measurements are to be taken, are approximately equidistant from the edge of the part 14. The surface touch measurements are used to calculate the probable position of the edge of the part 14. In the embodiment shown, the surface touch positions 406 are located near to the edge (i.e., proximate the edge region) of the part 14, with respect to the size of the part as a whole. For example, location near to an edge may be defined as being within substantially 1 mm, 3 mm, 5 mm, 1 cm, 2 cm or 5 cm of the edge, or any distance in between these. The surface touch positions 406 should be located close enough to the edge of the part 502 to provide a good estimate of the position of the edge of the part without risking missing the part 14. The skilled person will understand that what constitutes "close enough" varies from part to part and based on the required accuracy/certainty of measurement.

The second path 440, defined by data in the second queue, comprises positions 404 at which edge measurements are to be performed, i.e., where the tip 300 is to be brought into contact with the edge 400 of the part 14. In the embodiment being described, the tip is brought into contact with an edge 400 of the part, but in other embodiments, the tip is brought into contact with an edge region of the part. Reference to edge may be more appropriate for sheet parts.

Measurement data which comprises a position at which contact was made with the part is generated when an edge measurement is performed.

Again, the positions at which edge measurements are to be taken are illustrated with a dot within the Figure. It will be appreciated that the problem highlighted with reference to FIG. 3C are more likely to occur when an edge measurement is taken. Each edge measurement is performed by moving the probe 16 into contact with the edge of the part 14. The second queue, to cause the probe 16 to move along the second path 440, is also executed asynchronously by the measuring device 10.

In the embodiment being described, it will be seen that each edge measurement is performed at a position proximate the position at which a surface touch measurement is performed. In FIG. 4a, it can be seen that, in the embodiment being described, an edge measurement is performed for each surface touch measurement. In other embodiments, as described below, there may be performed more edge measurements when compared to surface touch measurements.

Thus, in the embodiment being described, each of the two paths 430, 440 are executed independently of one another such that surface touch measurements are performed in the first queue defining the first path 430 and then edge measurements are performed in a separate, second, path 440 defined by the second queue.

Such an embodiment is believed advantageous as only one pause for calculation to calculate the positions for the edge measurements 404 is needed which pause occurs once the first queue has been executed to cause the probe 16 to move along the first path 430. This pause is illustrated by point 435 in FIG. 4A between the first path 430 and the second path 440.

Thus, in summary of FIG. 4A, the probe 16 starts at point A and is caused to execute a series of surface touch measurements, in a first path 430, which is specified in a first queue. Once the first queue has been executed, the probe pauses at point 435 and the positions provided by the surface touch measurements are analyzed to calculate a series positions at which edge measurements should be performed. These edge touch positions are provided as a second queue which defines a path 440 which the probe is then caused to execute.

It is conceivable that in other embodiments the edge touch points could be calculated as the first path 430 is executed. In such an embodiment, the delay for calculation at point 435 can be reduced or minimized by collecting data of surface touch measurements 406 as soon as they become available and performing adjustment calculation for edge measurement positions 404 using the data. In one particular embodiment all of, or at least substantially all of the, surface touch points in the first path have been processed before the probe reaches point 435.

Figure 4B:
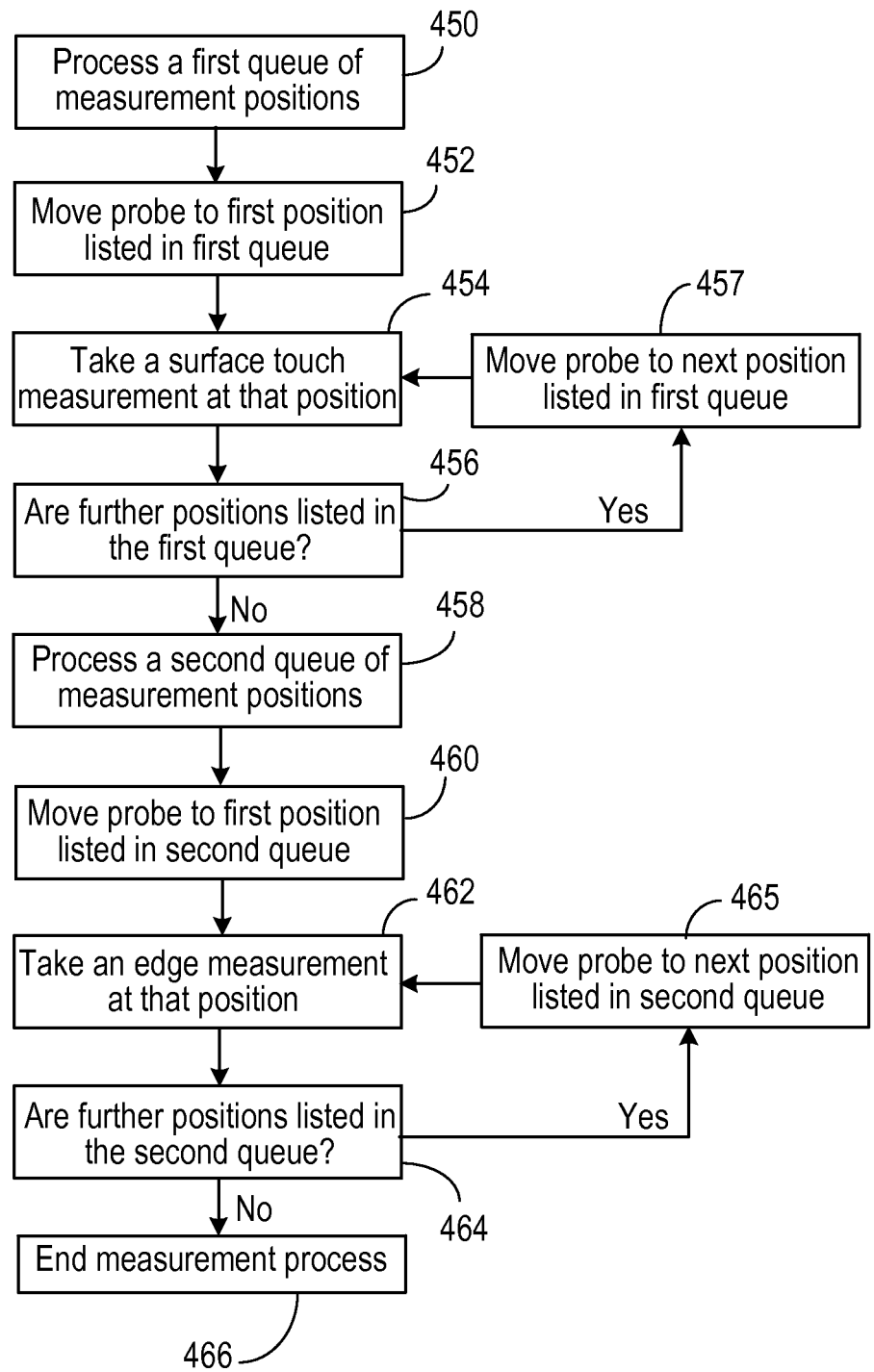
FIG. 4B shows the method illustrated in FIG. 4A, noting steps performed by the measuring device.
Figure 4C:
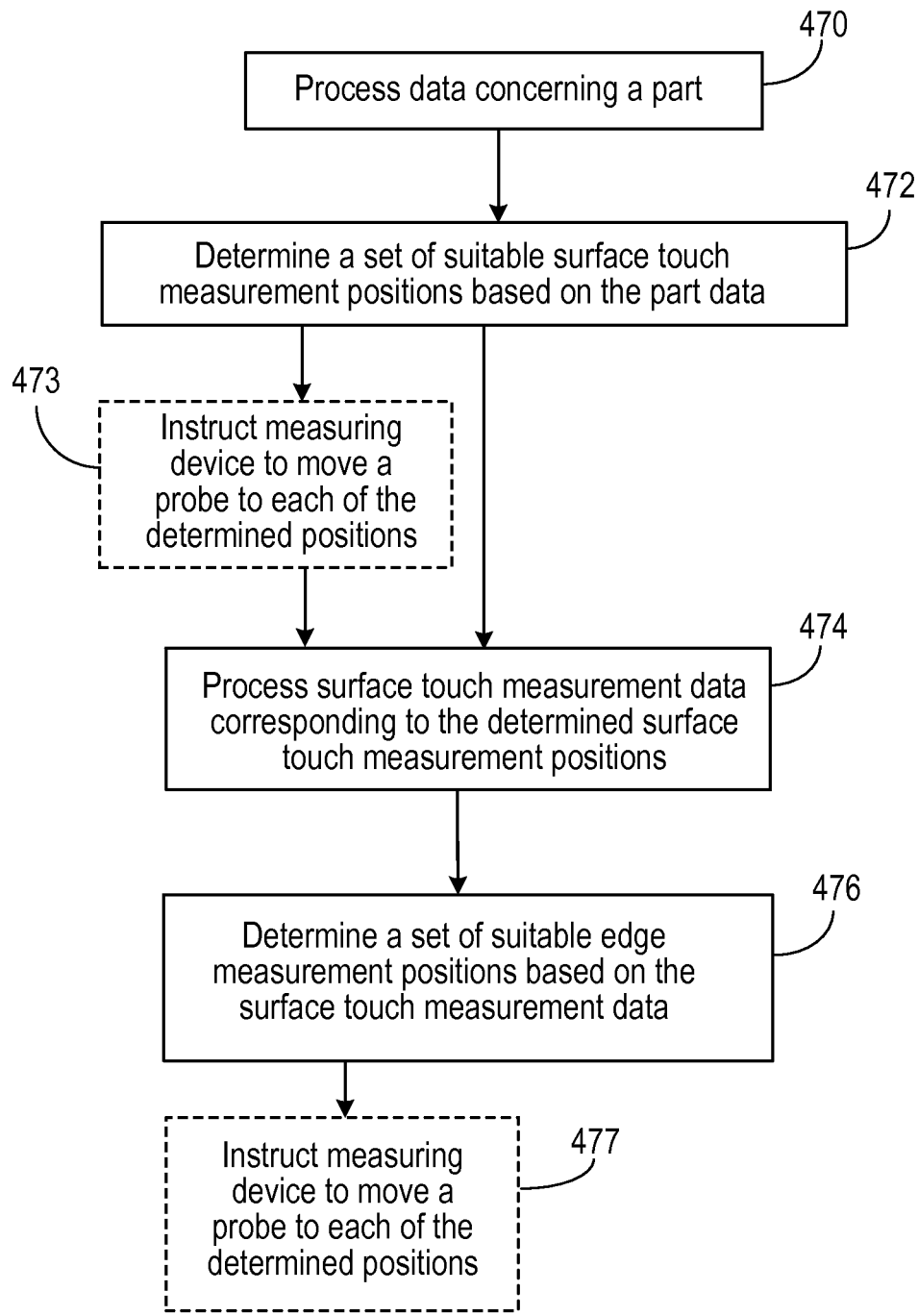
FIG. 4C shows the method illustrated in FIG. 4A, noting steps performed by software which may or may not be installed on the measuring device.

The method carried out by the measuring device 10, and described in relation to FIG. 4A, is illustrated in FIG. 4B. FIG. 4C illustrates the steps of the method which, in the embodiment being described, are performed on a computer in communication with the measuring device.

Data which in the embodiment being described comprises a CAD model concerning the part 14, is processed 470 in order to generate 472 a set of positions at which surface touch measurements are to be taken, the set of positions forming the first queue.

The measuring device 10 processes 450 the first queue of positions and moves 452, 457 the probe to each position. The trajectory to use to move to each point may be calculated by the computer or by the measuring device, as part of process 472, 473 or of process 450. A surface touch measurement is performed 454 at each position in the first queue.

Measurement data concerning the part, which was obtained from the surface touch measurements 454, is processed 474 in order to generate 476 a set of positions at which edge measurements are to be taken, the set of positions forming the second queue.

The measuring device processes 458 the second queue of positions and moves 460, 465 the probe to each position. The trajectory to use to move to each point may be calculated by the computer or by the measuring device, as part of process 476, 477 or of process 458. An edge measurement is performed 462 at each position in the second queue.

Thus, as the method of the embodiment being described generates measurement data providing at least one of the position of each contact between the probe and the surface in a surface touch measurement and the position of each contact between the probe and the edge of the part in an edge measurement. The measurement data is typically output for further processing.

FIG. 5A is used to illustrate an embodiment in which measurement of a part 502 is performed using a two paths 530a, 540a which are specified in a first queue of surface touch measurements performed at positions 506*a* and a second queue 540*a* of edge measurements performed at positions 504*a*. In this embodiment, as with the embodiment described in relation to FIG. 4A, the positions 506*a* at which surface touch measurements are performed are paired with the positions 504*a* at which edge measurements 504*a* are performed and the number of surface touch measurements is therefore equal to the number of edge measurements. The number of edge measurements is often user-defined, either by a set number or a set number of points per unit length being defined or by points at which measurements should be taken being explicitly provided.

In FIG. 5B is used to illustrate an embodiment in which measurement of a part 502 is performed using two paths 530*b*, 540*b* which are specified in a first queue of surface touch measurements performed at positions 506*b* and a second queue 540*b* of edge measurements performed at positions 504*b*. In this embodiment, the surface touch measurements are not all paired with the edge measurements, and the number of surface touch measurements is less than the number of edge measurements.

It is now described how embodiments can achieve the reduction in the number of surface touch measurements which brings with it an increase in speed at which the part 502 can be measured.

Here it will be appreciated that, in order to bring the tip 300 into contact with the surface of the part, the speed of the probe 16 must be slowed and therefore the fewer measurements that can be taken the quicker the probe 16 can be moved around the part 502.

In the embodiment described in relation to FIG. 5B, the number of edge measurements is maintained, to be the same as that shown in FIG. 5A, but the number of surface touch measurements is reduced when compared to that shown in FIG. 5A.

As described above, the positions at which surface touch measurements are to be taken are calculated from data representing the part. Typically the data representing the part will be provided by a CAD (Computer Aided Design) model but this need not be the case.

It can be expected that the real part 502 is roughly similar to the shape of a model (e.g., the CAD model) of the part, i.e., it is flat in regions where the model is flat, it bends in a similar fashion to the model, and it has sharp changes in shape where the model does so. Therefore, it should be possible to take fewer surface touch measurements in some areas where the shape of the part is more predictable. The positions of the surface of the part obtained from the surface touch measurements are used to interpolate the shape of the part 502 between and around the surface touch positions 506*b*. Embodiments, as with the embodiment being described, employing such interpolation allow the positions for the edge measurements to be calculated with fewer surface touch measurements.

Areas in which the density of surface touch positions 506*b* can be reduced or, the surface touch positions 506*b* moved, are determined automatically by software used to generate the first queue of surface touch positions used to drive the measuring device 10. Density and/or position of surface touch measurements are determined according to parameters such as any of the following: the shape of the part; the thickness of material from which the part is fabricated; material properties; process properties; accuracy; diameter of probe tip.

It can be seen within the paths 530*b*, 540*b*, shown in FIG. 5B, that the number of surface touch points 506*b* at which surface touch measurements are taken is less than the number of edge touch points 504*b* at which edge measurements are taken.

In particular, it can be seen that the number of surface touch points 506*b* is increased at areas where the part 502 is curved. For example, in vicinity of the straight region 510 there is a surface touch point 506*b* at either end 512, 514. However, in the region of the corner 516 there four surface touch points 518. Generally, the number of surface touch measurements increases as the expected curvature of the part 502 increases, as determined from, for example, a CAD model. That is, additional surface touch measurements are placed where there is an increased chance of the part 502 deviating from its designed shape.

Each surface touch measurement is used to calculate the positions for one or more edge measurements. The 1:1 relationship of surface touch measurements and edge measurements (as referred to in FIGS. 4A and 5A) is replaced by a 1:x relationship. Further, x may vary between surface touch measurements. The relationship can be described as 1:n-1:m-1:k- . . . , wherein n,m,k are different numbers of edge measurements taken based on each surface touch measurement.

In some implementations, the corresponding edge measurements may be performed immediately after the surface touch measurement has been taken. The measurements may be performed synchronously. Alternatively, a queue of the n, m or k edge measurement positions may be generated following each surface measurement and performed synchronously.

FIG. 5B shows use of the 1:x relationship within the two queues defining two paths as described above. The edge measurements take at edge positions 504*b* are performed in a single path, defined by a single queue, after the surface touch measurements have been performed and take at surface touch positions 506*b*.

In the embodiment being described, the path illustrated in FIG. 5B is therefore performed using an automatic process that optimizes the number and position of surface touch measurements in order to reduce the path length along which the probe 30 moves.

The embodiment described using FIG. 5B shows the use of two paths, the first comprising surface touch positions 506*b* and the second comprising edge touch positions 504*b* where the positions 506*b*, 504*b* within each path are largely unpaired. The skilled person will understand that, in alternative embodiments, a single path comprising both surface touch and edge touch positions may also be calculated using interpolation as described in relation to FIG. 5B. Unpaired surface touch measurement positions 506*b* can be used in synchronous queues wherein the following process occurs:
  (i) a surface touch measurement is taken at a defined point;
  (ii) one or more edge measurement positions 504*b* are calculated based on that surface touch measurement;
  (iii) measurements are taken at the one or more edge measurement positions 504*b* so calculate; and
  (iv) the probe moves to the next surface touch position 506*b* to take the next surface touch measurement.

Figure 5C:
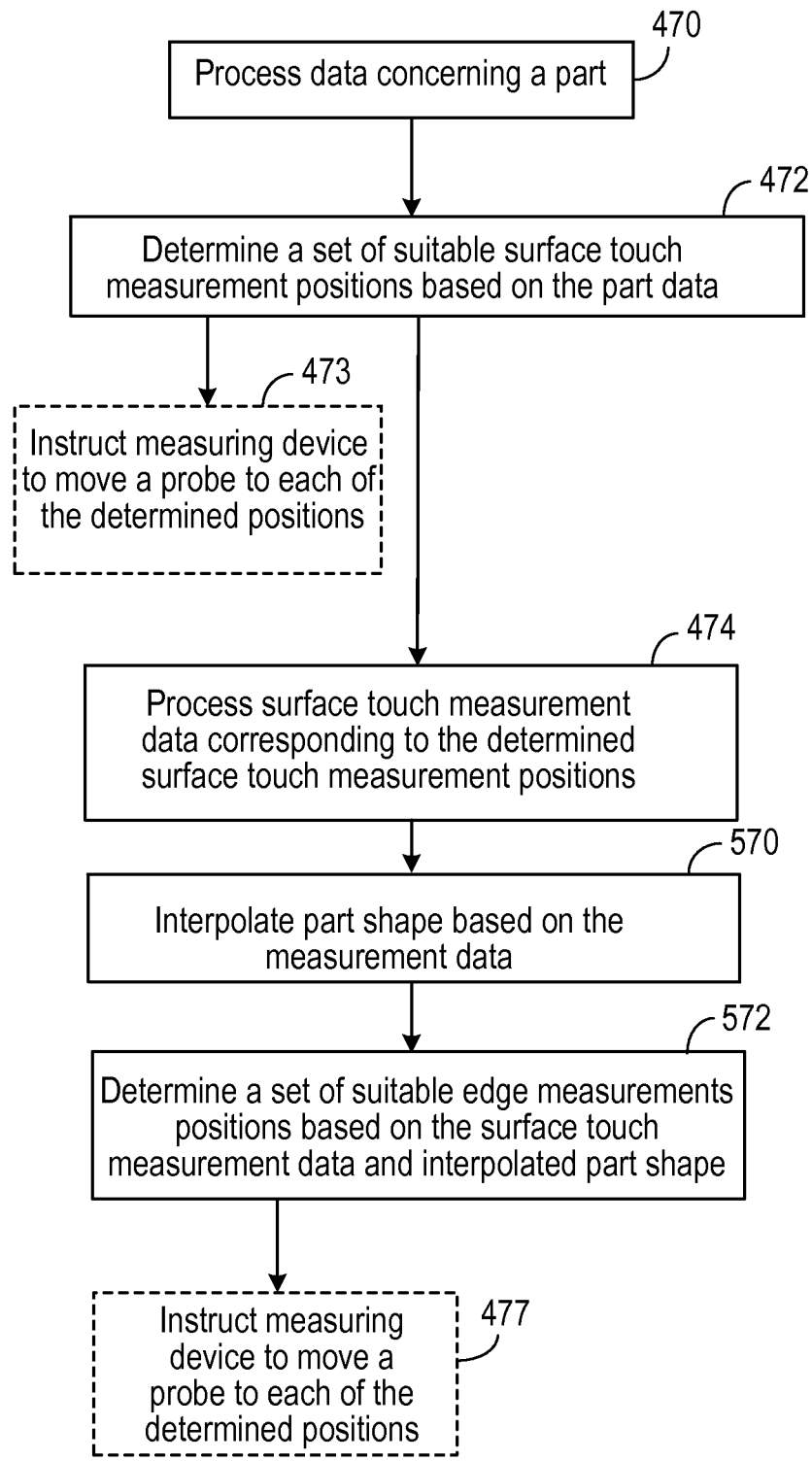
FIG. 5C shows the method illustrated in FIG. 5B.

FIG. 5C is used to further describe the method described in relation to FIG. 5B. As compared to the method shown in FIG. 4C, step 476 has been expanded. The shape of the part is interpolated 570 based on the surface touch measurement data. The positions for edge measurements are then determined 572 based on the interpolated shape of the part. Advantageously, interpolation allows the determination of more than one edge measurement position per surface touch measurement position. The skilled person will understand that the set of suitable surface touch measurement positions mentioned at step 472 may comprise a single surface touch position.

The number of surface touch measurements for adaptive probing can therefore be decreased in order to increase efficiency of measuring device 10 utilization.

Figure 6A:
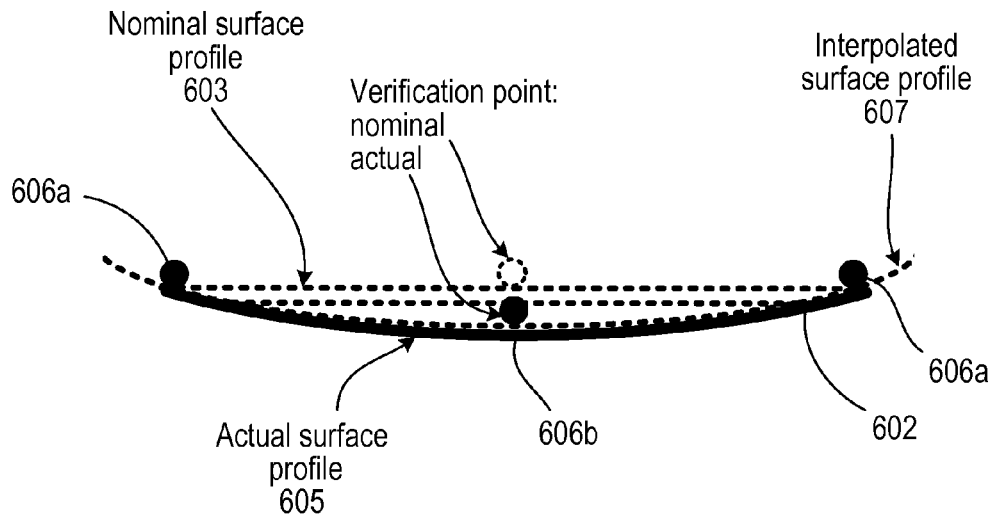
FIGS. 6A, 6B, 6C and 6D illustrate the use of further verification points for checking measurements.
Figure 6B:
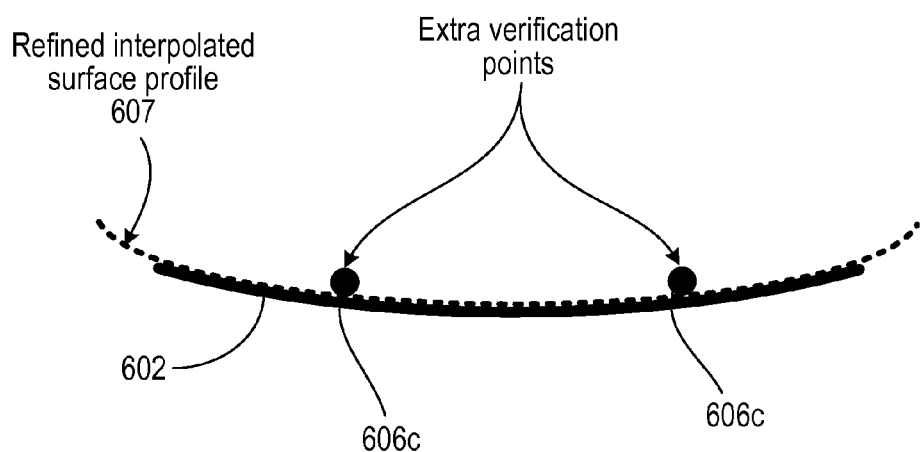

FIGS. 6A and 6B show an iterative measurement method implemented in an embodiment to be described to improve accuracy, wherein a first step of the method is shown in FIG. 6A and a second step is shown in FIG. 6B.

In the first step shown in FIG. 6A it is initially assumed that the part 602 is flat, with nominal surface profile 603 (i.e., the part 602 is planar) which assumption is based on interpolation between an initial two surface touch measurements 606a.

In this embodiment, a verification point 606b (which is a further surface touch point at which a measurement is taken) is used to check that that the part 602 does in fact have the shape that it is assumed to have. As can be seen in FIG. 6A, the verification point reveals the assumption that the part 602 has a flat nominal surface profile 603 to be inaccurate. Thus, further verification points (i.e., further surface touch points at which measurements are taken) are generated, and a new surface profile 607 is then interpolated.

The process then generates two additional verification points 606c (i.e., further surface touch points at which measurements are taken). In step two, the measurement results from the two additional verification points 606c are used to confirm that the revised interpolated surface profile 607 is within tolerance of the actual part profile 605. The resulting interpolated surface profile 607 is used to calculate or adjust positions of edge measurements.

Figure 6C:
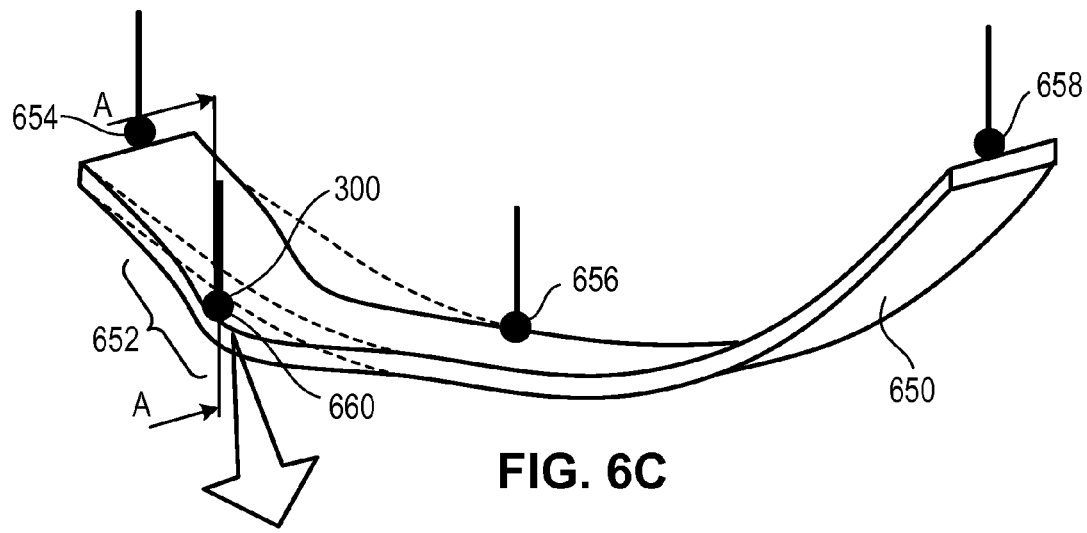
Figure 6D:
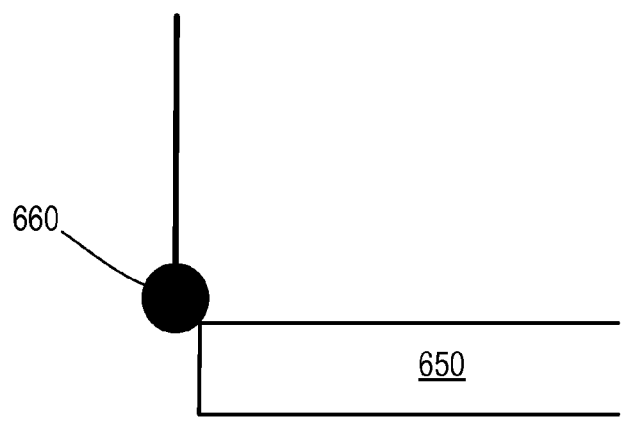

The advantage of embodiments described in relation to FIGS. 6A and 6B are further highlighted with reference to FIGS. 6C and 6D. Here is noted that FIG. 6D is a cross section along line AA in FIG. 6C.

FIG. 6C schematically shows a perspective view of a part 650 which should have a simple curved shape (e.g., a 'U' shape) has highlighted by the dotted line. However, it can be seen that the part 650 is locally distorted in the region 652 and deviates from the simple curve. However, the local distortion 652 is such that the three surface touch measurement positions 654, 656, 658 correctly contact the part 650 since the part is not distorted where those surface touch measurements are to be taken.

However, because more edge measurements may well be taken when compared with surface touch measurements (e.g., 660), any edge measurements taken in the vicinity of the local distortion 652, may well not contact the part correctly in view of that local distortion 652. This is illustrated in FIG. 6D which highlights that the probe tip 300 has travelled too far to the right with reference to the part 650 and will thus give an inaccurate reading.

Thus embodiments may be arranged to detect anomalous edge measurements and take further surface touch measurements. Thus with reference to FIGS. 6C and 6D, the edge measurement 660 is likely to highlighted as anomalous as it would indicate that the edge at that position was too far to the right when compared to neighboring measurements. Accordingly, at least some embodiments may be arranged to generate a further queue of points at which surface touch measurements should be performed in order to give greater certainty for edge measurements in that region.

Figure 7:
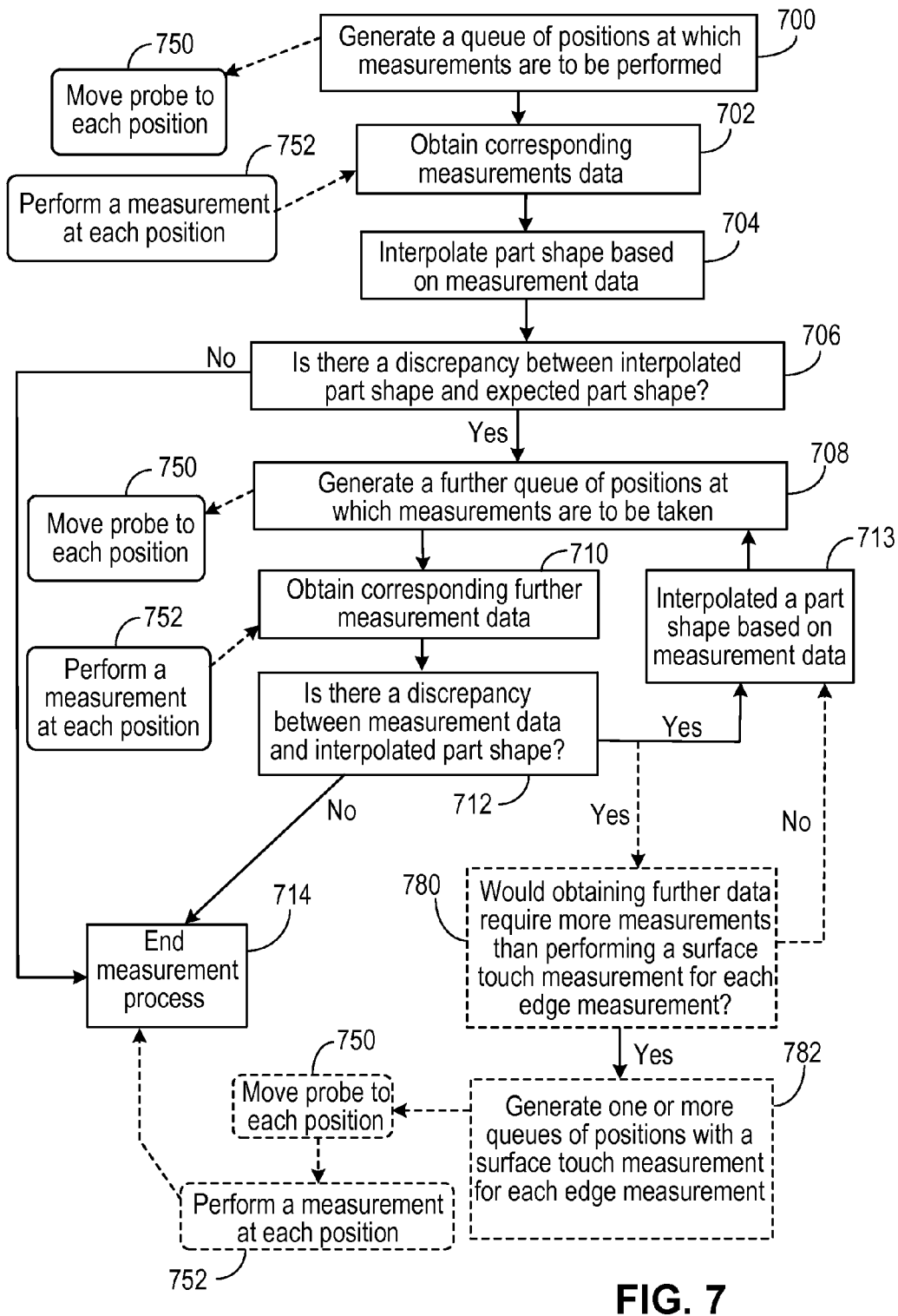
FIG. 7 shows an iterative method of verifying measurements.

FIG. 7 illustrates the method described in relation to FIG. 6. Steps 750 (moving the probe) and 752 (performing a measurement) are performed by the measuring device. In the embodiment being described, the remaining steps are performed on a processing circuitry controlling the measuring device, which may be internal or external the measuring device.

At step 700, a queue of positions at which measurements are to be performed is generated. Measurement data is generated when a measurement is taken at one of these positions, and this measurement data 702 is then used 704 to interpolate the shape of a part. The skilled person will understand that data from either or both of the first and second queues can be used in these steps.

At step 706, a determination is made as to whether or not there is a discrepancy between the expected part shape and the interpolated part shape. The existence of a discrepancy may be defined as detailed above with reference to FIGS. 6A and 6B. In the embodiment being described, the method terminates 714 at that point if there is no discrepancy.

If there is a discrepancy, a further queue of positions is generated 708 at which further surface touch measurements are to be taken. The further measurement data obtained 710 from performance of this queue of positions are compared to the interpolated 704 part shape stored in memory to determine 712 if there is a discrepancy. The method terminates 714 if there is no discrepancy.

If there is a discrepancy, a new interpolated part shape 713 is generated from the further measurement data. The method then returns to step 708, and a new queue of measurement positions is generated based on the newly interpolated 713 part shape.

In the embodiment being described, this cycle iterates until there is no discrepancy between the "old" and "new" interpolated part shapes.

In alternative embodiments, in which the method described in relation to FIG. 5B is used, an extra determination step 780 may be introduced. In such embodiments, fewer surface touch measurements are used than edge measurements; this improves efficiency but can lead to inaccuracies in shape interpolation.

If there is a discrepancy following any queue after the third queue used, a determination 780 is made as to whether or not obtaining further data would be less efficient than performing a surface touch measurement for each edge measurement. If w not, the method returns to step 713.

If so, the method moves onto step 782 and a 1:1 ratio of surface touch and edge measurements are performed.

What is claimed is:

1. A measuring device arranged to take measurements of a part using one or more probes which are controlled to contact the part at positions, wherein two or more queues of measurement positions are used to control the position of the one or more probes, the queues comprising:
   a first queue comprising positions at which surface touch measurements are to be performed, wherein each surface touch measurement is performed by moving at least one of the one or more probes into contact with a surface of the part; and
   a second queue comprising positions at which edge measurements are to be performed, wherein each edge measurement is performed by moving at least one of the one or more probes into contact with an edge region of the part;
   and wherein the measuring device is arranged to:
   (i) process the first queue, comprising surface touch measurement positions;

(ii) move at least one of the one or more probes to each position listed in the first queue, taking a surface touch measurement at each position to generate surface touch measurement data;

(iii) process the second queue, comprising edge measurement positions; and (iv) move at least one of the one or more probes to each position listed in the second queue, taking an edge measurement at each position to generate edge measurement data.

2. The measuring device of claim 1, wherein the measuring device is arranged to perform at least one of steps (ii) and (iv) asynchronously.

3. The measuring device of claim 1, wherein the measuring device is arranged to output measurement data comprising at least one position for the contact between the at least one probe, and each surface touch measurement, and each edge measurement, following the corresponding measurement.

4. The measuring device of claim 3, wherein the measuring device is arranged to take surface touch measurements proximate an edge region of the part.

5. The measuring device of claim 3, wherein the measuring device is arranged to take an edge measurement proximate one or more surface touch measurements.

6. The measuring device of claim 1, wherein the measuring device is arranged to take an edge measurement corresponding to substantially each surface touch measurement.

7. The measuring device of claim 1, which is arranged to calculate the positions at which edge measurements are to be performed within the second queue based on the surface touch measurement data.

8. The measuring device of claim 7, wherein the measuring device is arranged to take fewer surface touch measurements caused by the first queue when compared to the number of edge measurements caused by the second queue.

9. A computer-implemented method for controlling the measuring device of claim 1, wherein the method comprises:
processing data providing information on a shape of the part to determine a set of suitable surface touch positions, the set of suitable surface touch positions being used to generate the first queue;
instructing the measuring device to move at least one of the one or more probes to each position listed in the first queue, and to take a surface touch measurement at each position;
calculating a set of suitable edge touch positions based on the surface touch measurements, the set of suitable edge touch positions being used to generate the second queue of measurements; and
instructing the measuring device to move the at least one of the one or more probes to each position listed in the second queue, and to take an edge measurement at each position.

10. A computer-implemented method of generating a path for a measuring device to take measurements of a part using one or more probes which are controlled to touch the part at positions, wherein two or more queues of measurement positions are used to control the position of the one or more probes, the queues comprising:
a first queue comprising positions at which surface touch measurements are to be performed, wherein each surface touch measurement is performed by moving at least one of the one or more probes into contact with a surface of the part; and
a second queue comprising positions at which edge measurements are to be performed, wherein each edge measurement is performed by moving at least one of the one or more probes into contact with an edge region of the part;
wherein the method comprises:
(i) processing data providing information on a shape of the part to determine a set of suitable surface touch positions, the set of suitable surface touch positions being used to generate the first queue; and
(ii) processing surface touch measurement data corresponding to the first queue to determine a set of suitable edge touch positions, the set of suitable edge touch positions being used to generate the second queue of measurements.

11. The computer implemented method according to claim 10, comprising:
comparing at least one of the edge measurements against an expected edge measurement; and
determining if a discrepancy exists between the expected and actual edge measurement.

12. The computer implemented method according to claim 11, comprising, should a discrepancy be determined, determining positions for a third queue of measurements, wherein the third queue comprises further positions at which surface touch measurements, edge measurements, or both surface touch measurements and edge measurements are to be performed.

13. The computer implemented method according to claim 10, comprising receiving position data from edge measurements taken at edge touch positions defined in the second queue.

14. The computer implemented method according to claim 13, comprising:
comparing at least one of the edge measurements against an expected edge measurement; and
determining if a discrepancy exists between the expected and actual edge measurement.

15. The computer implemented method according to claim 14, comprising, should a discrepancy be determined, determining positions for a third queue of measurements, wherein the third queue comprises further positions at which surface touch measurements, edge measurements, or both surface touch measurements and edge measurements are to be performed.

16. A processing apparatus arranged to generate a path for a measuring device to take measurements of a part using one or more probes which are controlled to touch the part at positions, wherein the measurements comprise:
surface touch measurements, wherein each surface touch measurement is performed by moving at least one of the one or more probes into contact with a surface of the part; and
edge measurements, wherein each edge measurement is performed by moving at least one of the one or more probes into contact with an edge region of the part, and wherein the positions at which the edge measurements are to be performed are calculated based on positions generated from surface touch measurements; and
wherein the processing apparatus is arranged to generate more than one edge measurement for at least some of the surface touch measurements.

17. The processing apparatus of claim 16, wherein more than one edge measurement is generated for each of the at least some of the surface touch measurements based on an interpolated shape of the part.

* * * * *